United States Patent [19]

Yoshino et al.

[11] Patent Number: 5,513,106
[45] Date of Patent: Apr. 30, 1996

[54] SYSTEM FOR CONTROLLING LOCOMOTION OF A WALKING ROBOT HAVING A SENSOR FOR DETECTING EXTERNALLY EXERTED FORCES

[75] Inventors: Ryutaro Yoshino; Hideo Takahashi, both of Saitama, Japan

[73] Assignee: Honda Giken Kogyo Kabushiki Kaisha, Tokyo, Japan

[21] Appl. No.: 343,206

[22] Filed: Nov. 22, 1994

Related U.S. Application Data

[63] Continuation of Ser. No. 994,616, Dec. 21, 1992, abandoned.

[30] Foreign Application Priority Data

Dec. 20, 1991 [JP] Japan ................. 3-355919

[51] Int. Cl.$^6$ ................. G06F 7/70; B25J 5/00; G05B 19/04
[52] U.S. Cl. ................. 364/424.02; 318/568.12; 318/568.1; 318/568.22; 318/625; 901/1; 901/9; 901/33; 180/8.1; 180/8.2; 180/8.4; 180/8.6; 395/88; 395/95; 395/82; 395/84
[58] Field of Search ............. 364/424.02, 424.05, 364/424.01, 463; 180/8.1, 8.4, 8.6, 8.5; 318/568.1, 625, 568.12, 568.22, 568.11, 568.16; 901/1, 9; 395/95, 88, 80, 82, 84, 81, 96, 93; 36/28, 30 R, 65 A, 139

[56] References Cited

U.S. PATENT DOCUMENTS

| | | | |
|---|---|---|---|
| 5,130,632 | 7/1992 | Ezawa et al. | 318/568.11 |
| 5,151,859 | 9/1992 | Yoshino et al. | 364/424.02 |
| 5,159,988 | 11/1992 | Gomi et al. | 180/8.6 |
| 5,221,883 | 6/1993 | Takenaka et al. | 318/568.12 |
| 5,252,901 | 10/1993 | Ozawa et al. | 318/568.12 |

FOREIGN PATENT DOCUMENTS 3184782 12/1991 Japan.

OTHER PUBLICATIONS

1989 IEEE "Acceleration Compensation for Biped Robots to Reject External Disturbances" (Y. Zheng).

*Primary Examiner*—Kevin J. Teska
*Assistant Examiner*—Jacques H. Louis-Jacques
*Attorney, Agent, or Firm*—Lyon & Lyon

[57] ABSTRACT

A system for controlling the locomotion of a biped walking robot having a body and a pair of legs each connected to the body through a hip joint and having a knee joint and an ankle joint and a foot at its distal end in accordance with predetermined locomotion data including a foot landing position of a lifted leg. A 6-dimensional force and torque sensor is provided at the body to detect an external force exerted on the robot. A moment is calculated from the external force and integrated during the external force exists. A coefficient is further determined in accordance with the trajectory of the lifted leg and is multiplied to the integrated moment. The predetermined foot landing position is corrected in response to the product and control values for the associated drive joints are changed such that the lifted leg will land at the corrected position, whereby preventing the robot from losing its stability when the external force exerts on the robot.

16 Claims, 10 Drawing Sheets

Footfall position corrected for external force

Fy = 0 footfall position

$$M = F \cdot h$$

$$\begin{cases} \Delta Y = n \int_0^t M_x \cdot dt \\ \Delta X = n \int_0^t M_y \cdot dt \end{cases}$$

$$M = F \cdot h$$

$$\Delta X = n \int_0^t kx \cdot Fy \cdot dt$$

$$\Delta Y = n \int_0^t ky \cdot Fy \cdot dt$$

$$\left( \begin{array}{l} \Delta X = n \int_0^t kx \cdot Fx \cdot dt \\ \Delta Y = n \int_0^t ky \cdot Fx \cdot dt \end{array} \right)$$

1

SYSTEM FOR CONTROLLING LOCOMOTION OF A WALKING ROBOT HAVING A SENSOR FOR DETECTING EXTERNALLY EXERTED FORCES

This application is a continuation-in-part application of application Ser. No. 07/994,616, filed on Dec. 21, 1992, now abandoned.

BACKGROUND OF THE INVENTION

1. Field of the Invention

This invention relates to a system for controlling the locomotion of a legged robot, and more particularly to a system for quickly stabilizing the attitude of a biped or other legged robot whose attitude has been destabilized owing to an external force, by correcting the footfall position of its free leg.

2. Description of the Prior Art

Biped personal robots are expected to come into common use in the human living environment in the not-too-distant future. In an actual use environment, such robots are apt to bump into people and objects or to be bumped into by people. As such contacts can destabilize the attitude of a biped robot (throw it off balance), there is a high probability of its falling over and becoming incapacitated. A biped robot is particularly susceptible to this problem because its manner of walking by supporting its weight on one leg while moving its free leg forward requires it to stand on one leg for a relatively long time.

Various techniques have been devised for controlling the attitude of biped robots. For example, at The 7th Annual Conference of Robotics Society of Japan, the Waseda University Laboratory proposed a system in which external forces acting on the robot are sensed by a six-dimensional force and torque sensor mounted at the shin portion of each leg link, the change in attitude due to the external forces is determined, and a compensatory action is conducted. In addition Clemson University of the U.S. has proposed a system in which external forces are detected from the angle between the sole of the foot of the supporting leg and the ground, and the change in attitude due to the external force is determined and corrected (IEEE, Transactions on Systems, Man and Cybernetics, Vol. 19, No. 1, 1989).

In both of these prior art systems, the corrective action is taken after determining the change in attitude caused by the external force. The delay between the time when the external force acts on the robot and the time when the action is taken to compensate for the external force is therefore relatively long.

SUMMARY OF THE INVENTION

This invention was accomplished for overcoming this problem by providing a system for controlling the locomotion of a legged robot which is able to take corrective action for restoring the robot to a stable attitude as soon as an external force acts on the robot.

For realizing this object, the present invention provides a system for controlling the locomotion of a legged walking robot having a body link and a plurality of articulated leg linkages each connected to the body link through a first joint and having at least a second joint at the articulation, including actuator means for driving the individual joints and control means for determining a control value of the actuator means for the individual joints based on locomotion data including a landing position of a lifted leg linkage. The system comprises first means for detecting an external force exerted on the body link and said control means adjusts the control value for at least one of the associated drive joints of a lifted leg linkage in response to the detected external force such that the lifted leg linkage will change the landing position.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Figure 1:
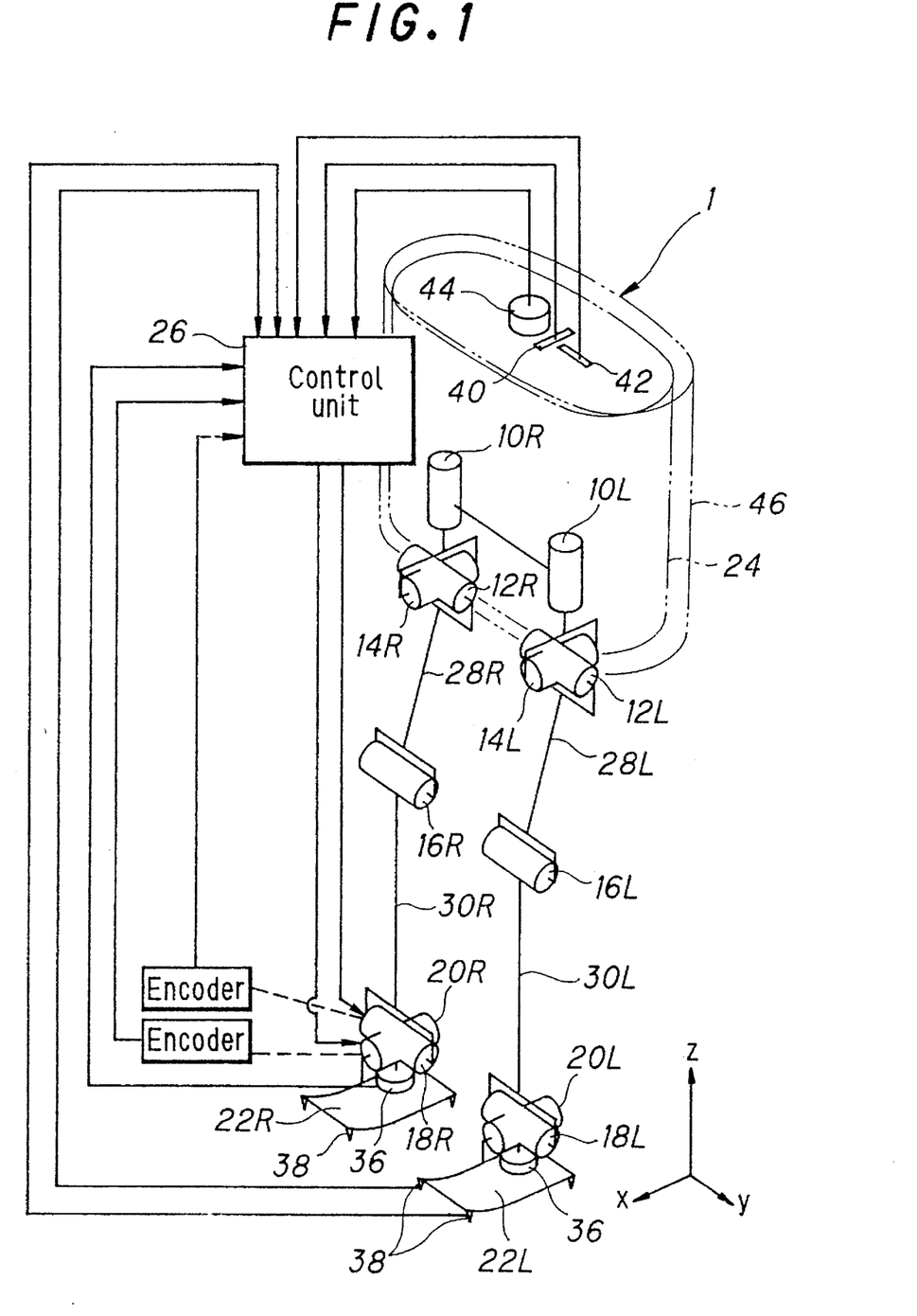
FIG. 1 is a schematic view showing the overall configuration of the system for controlling the locomotion of a legged robot according to this invention.

Embodiments of the invention will now be explained based on a biped robot as an example of a legged robot. An overall skeleton view of a biped robot 1 is shown in FIG. 1. The robot 1 has left and right legs each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (x direction), joints (axes) 14R, 14L for rotation at the hip in the roll direction (y direction), joints (axes) 16R, 16L for rotation at the knee in the pitch direction, joints (axes) 18R, 18L for rotation at the ankle in the pitch direction and joints (axes) 20R, 20L for rotation at the ankle in the roll direction. Foot members 22R, 22L are provided at the lower end of this arrangement and a body (main unit) 24 housing the control unit 26 at the upper end.

The hip joints in the foregoing configuration are constituted by the joints (axes) 10R(L), 12R(L) and 14R(L) and the ankle joints by the joints (axes) 18R(L) and 20R(L). The leg links of the respective legs thus have six degrees of freedom, so that during locomotion the legs as a whole can be caused to execute the desired movements by driving the 6×2=12 joints (axes) to appropriate angles. The robot is thus capable of walking freely within three-dimensional space. (It will be noted that the hip and knee joints are connected by thigh links 28R, 28L and the knee and ankle joints by crus links 30R, 30L.) The joints are constituted mainly by motors, as was mentioned earlier, and reduction gear mechanisms for increasing motor torque. The structure of the joints is described in detail in the applicant's earlier Japanese Patent Application No. 1(1989)-324,218 (Japanese Patent Public Disclosure No. 3(1991)-184,782, etc., and since it is not an essential aspect of the present invention, will not be explained further here.

Figure 2:
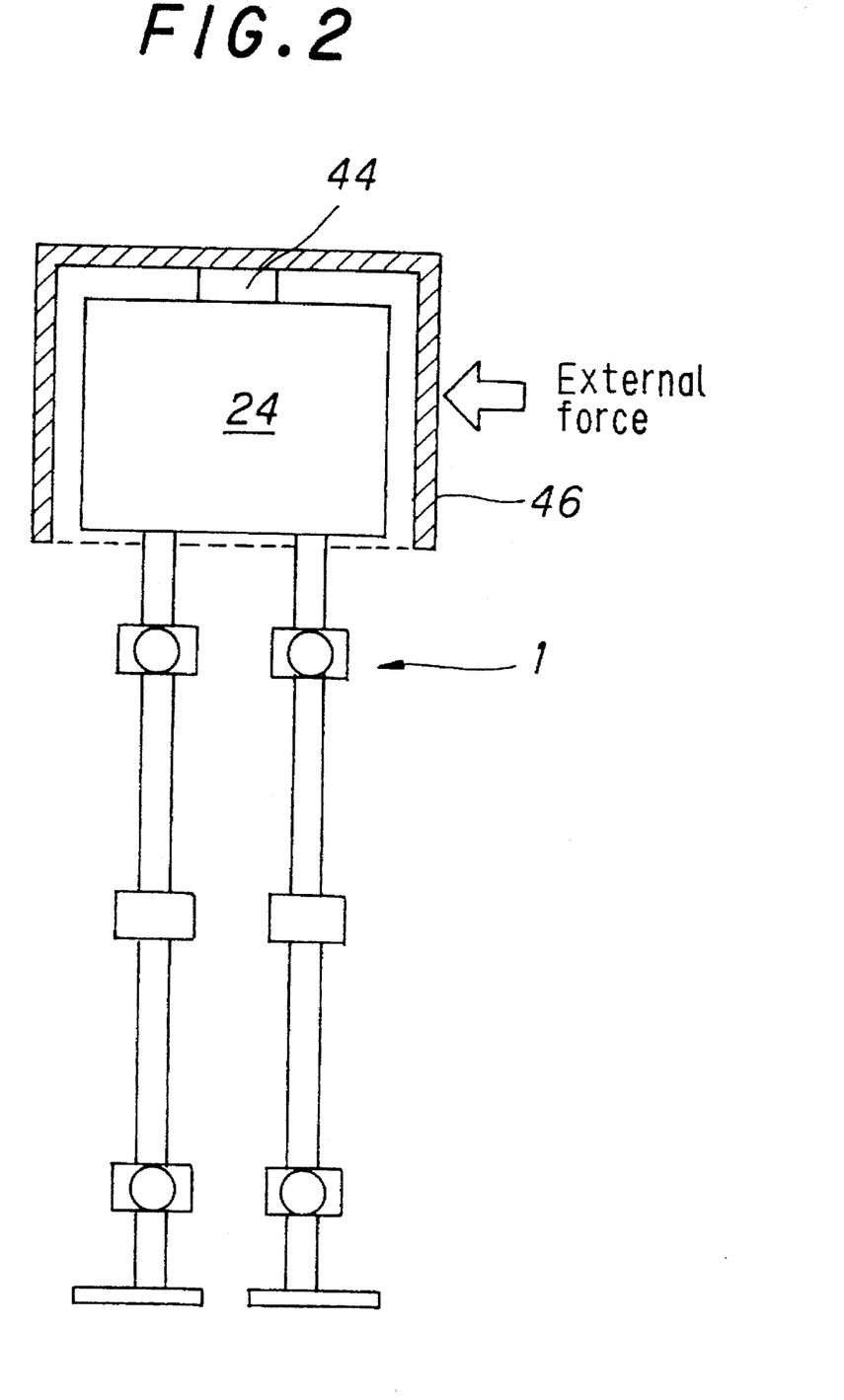
FIG. 2 is a front view, partially in section, showing how the legged robot of FIG. 1 is mounted with an external force sensor.

The ankles of the robot 1 shown in FIG. 1 are provided with six-dimensional force and torque sensor 36 of conventional design. By measuring the x, y and z force components Fx, Fy and Fz transmitted to the robot through the foot members and also measuring the moment components Mx, My and Mz around the three axes, the six-dimensional force and torque sensor 36 detect whether or not the associated foot member has landed and the magnitude and direction of the forces acting on the supporting leg. The sole of each foot member is equipped at its four corners with touch-down switches 38 of conventional design for detecting whether or not the foot is in contact with the ground. The top of the body 24 is provided with a pair of inclination sensors 40, 42 for detecting the robot's inclination angle and angular velocity relative to the z axis in the x-z and y-z planes. At a position on the top of the body 24 adjacent to the inclination sensors there is provided an external force sensor 44 for detecting external forces acting on the body 24. More specifically, as shown in FIG. 2, the body 24 is surrounded by a cover 46 attached to the body 24 via the external force sensor 44. The external force sensor 44 is a six-dimensional force and torque sensor, of the same type as sensor 36 referred to above. The sensor 44 is firmly attached to the body 24 and the cover 46 is firmly attached to the external force sensor 44. As a result, the sensor 44 is able to detect any external force (force or moment) acting on the cover 46. The outputs of the sensors 36 and the like are sent to the control unit 26 in the body 24.

Figure 3:
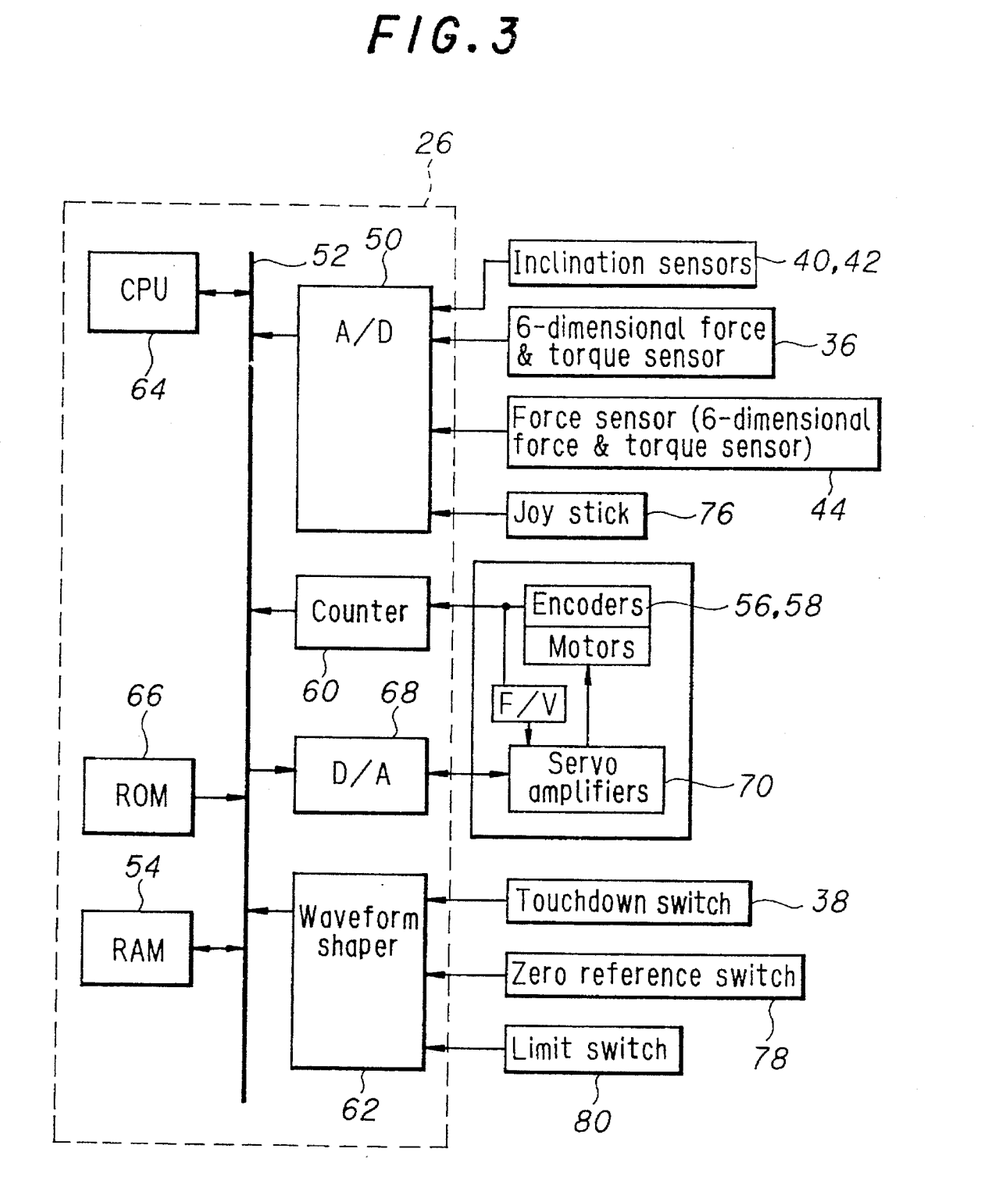
FIG. 3 is a block diagram for explaining the control unit shown in FIG. 1.

As shown in the block diagram of FIG. 3, the control unit 26 is constituted as a microcomputer. The outputs from the inclination sensors 40, 42 etc. are converted into digital signals by an A/D converter 50 and the resulting digital values are sent via a bus 52 to a RAM (random access memory) 54 for storage. In addition, the outputs of encoders disposed adjacent to the respective motors (only two encoders 56, 58 are shown in FIG. 1 by way of example) are input to the RAM 54 through a counter 60, while the outputs of the touchdown switches 38 and the like are stored in the RAM 54 via a waveform shaper 62. The control unit has a CPU (central processing unit) 64 which fetches locomotion data from a ROM (read-only memory) 66 and computes current command values from the deviation relative to the measured values received from the counter 60, and sends the same to a servo amplifier 70 of the respective motors via a D/A converter 68. Reference numeral 76 designates a joy stick for inputting commands to change the robot's stride and other aspects of its gait, reference numeral 78 a zero reference switch for setting the robot's beginning attitude (upright), and reference numeral 80 a limit switch for preventing overruns.

Figure 4:
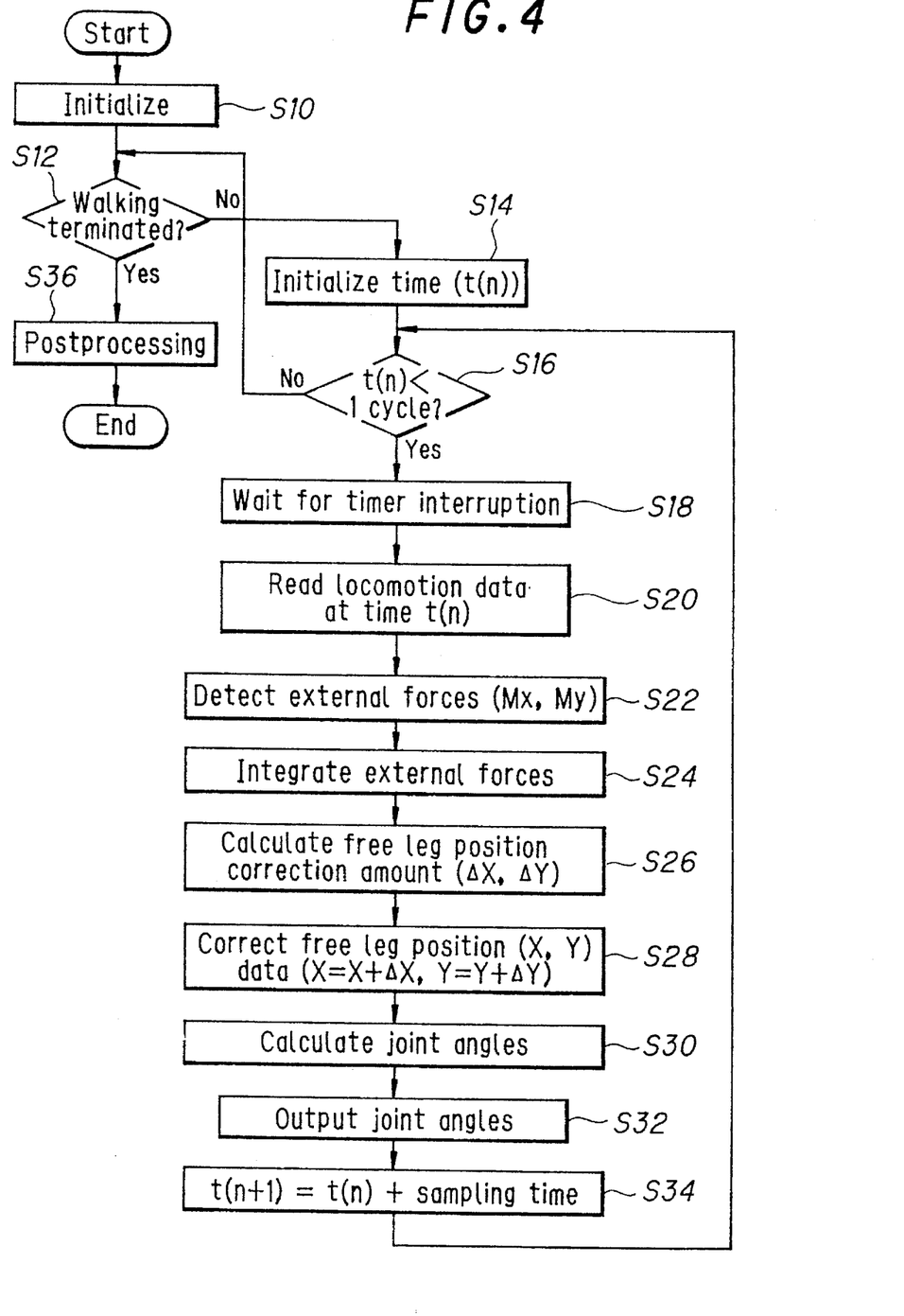
FIG. 4 is a flow chart of the operations of the control unit of FIG. 3.
Figure 5:
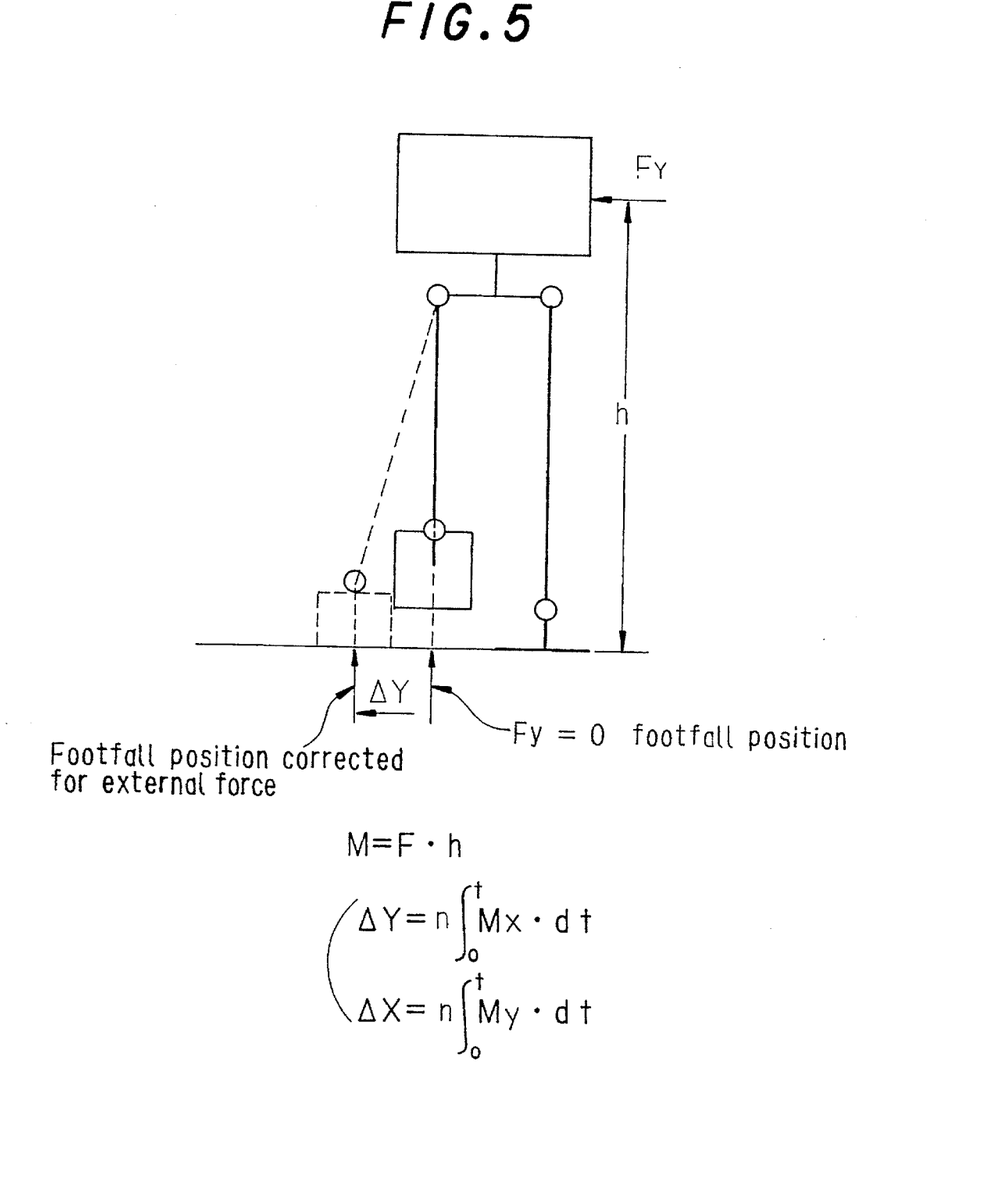
FIG. 5 is a diagram for explaining the corrective action taken when the legged robot of FIG. 1 receives an external force in a direction perpendicular to its direction of locomotion.
Figure 6:
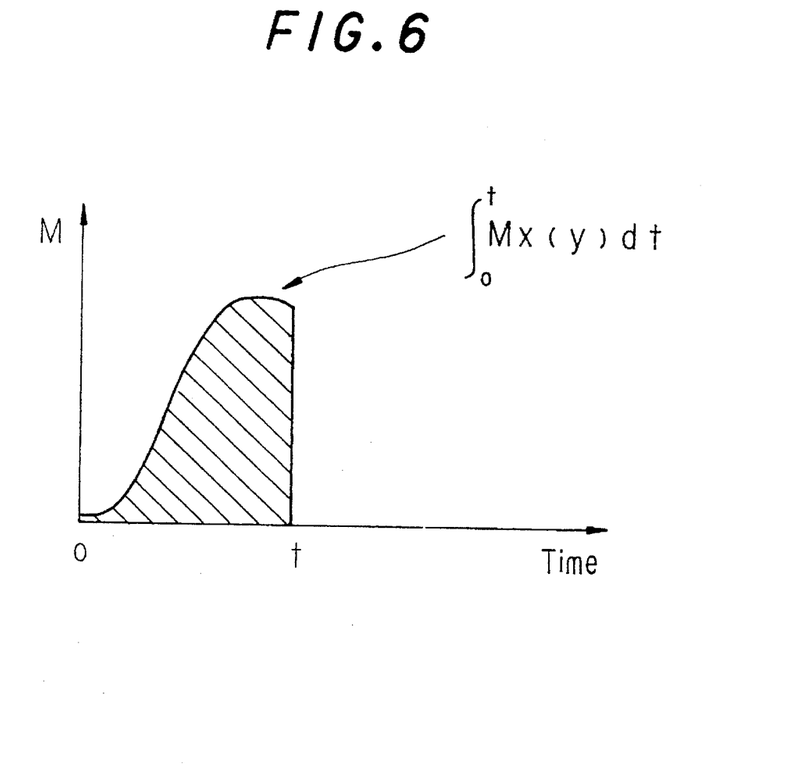
FIG. 6 is a graph showing the characteristics of the integrated external force used for determining the amount of the corrective action.
Figure 7:
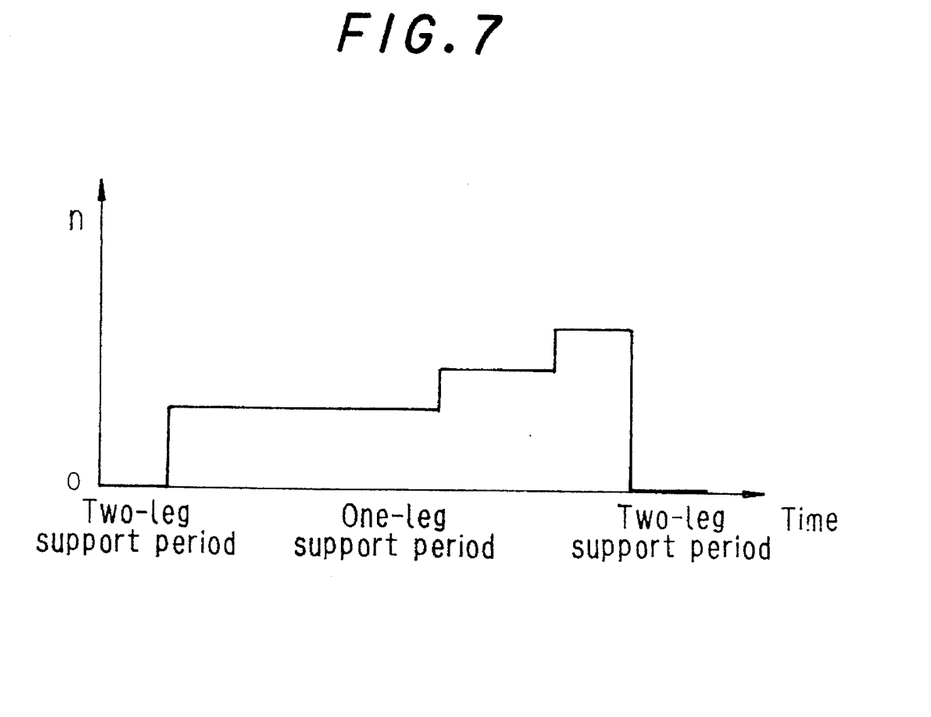
FIG. 7 is a graph showing the characteristics of a coefficient by which the integral value of the external force used for determining the amount of the corrective action is multiplied.
Figure 8:
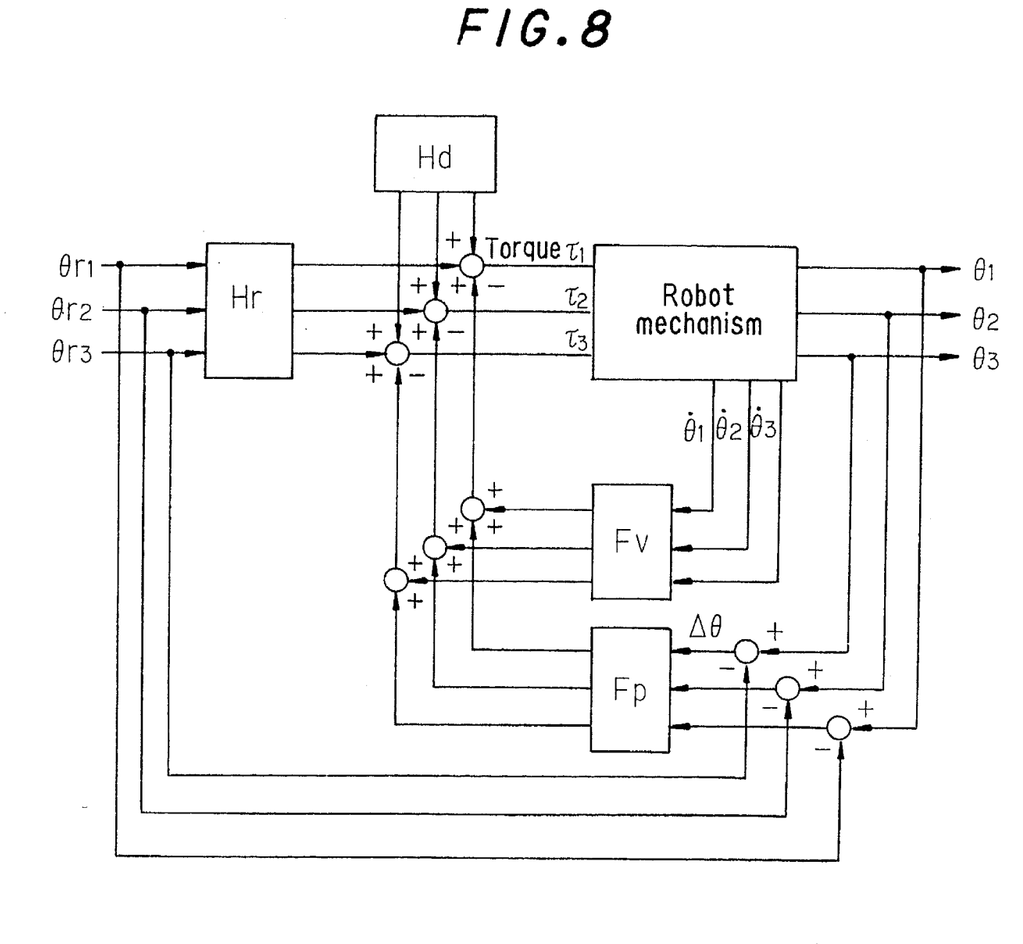
FIG. 8 is a block diagram showing the operations of the control unit in accordance with the flow chart of FIG. 4.

The operation of the system according to the invention will now be explained with reference to the flow chart of FIG. 4. First, however, the main features of the control will be outlined. The walking of the robot 1 of FIG. 1 involves alternately repeated one leg support periods and two leg support periods, during which the joint angles are computed in real time in accordance with time series walking data, e.g. center of gravity position data, footfall position data and the like. If during a one leg support period the robot receives a lateral external force Fy as shown in FIG. 5 (i.e. a force in the y direction where the x direction is defined as the travel (pitch) direction; see FIG. 1), the resulting moment M is calculated from the detection value output by the external force sensor (six-dimensional force and torque sensor) 44 using the equations shown in FIG. 5, the integral value of the moment (the integral force) over the period that the force continues to act is calculated as shown in FIG. 6, and the result is multiplied by a prescribed coefficient n to obtain the amount of free (lifted) leg footfall position correction (as distances in the x and y directions) delta X, delta Y. Since the external force Fy acting in the y direction while the robot is moving in the x direction not only produces a moment of value Mx around the x axis but also produces a moment of value My around the y axis, the amount of free leg footfall position correction is calculated accordingly as a correction distance delta X in the x direction and a correction distance delta Y in the y direction and the calculated correction distances are multiplied by the coefficient n and then combined. The characteristics of the coefficient n are shown in FIG. 7, from which it will be noted that the coefficient n varies with the position of the free leg along its trajectory. Specifically, it becomes greater with increasing proximity to the next two leg support period (i.e. as the free leg approaches footfall). It is defined in this way because, in view of the fact that the amount of correction is determined by multiplying the integral value of the moment by this coefficient, this makes it possible to increase the rate of correction with increasing proximity to footfall, whereby the robot's attitude can be restored more quickly. The block diagram of FIG. 8 illustrates the control operation. When the robot 1 receives an external force, the correction amount delta X (Y) determined in response to the force in the manner just explained is added to the preset locomotion data (the preset x and y direction positions of the footfall position) and the target joint angles are calculated on the basis of the sums obtained. Since the deviation and the motor drive torque therefore increase in proportion as the correction amount increases, the free leg drive rate also increases. In the control operation of the robot of FIG. 1 as modeled in FIG. 8, the control is premised on the method of controlling the torque $\tau$ in the equation of motion $\tau = Hr\theta r + Hd - Fp\theta - Fv\theta$ such that the actual angle $\theta r$ becomes the target angle $\theta$ (where Hr, Hd, Fp and Fv are determinants).

Figure 9:
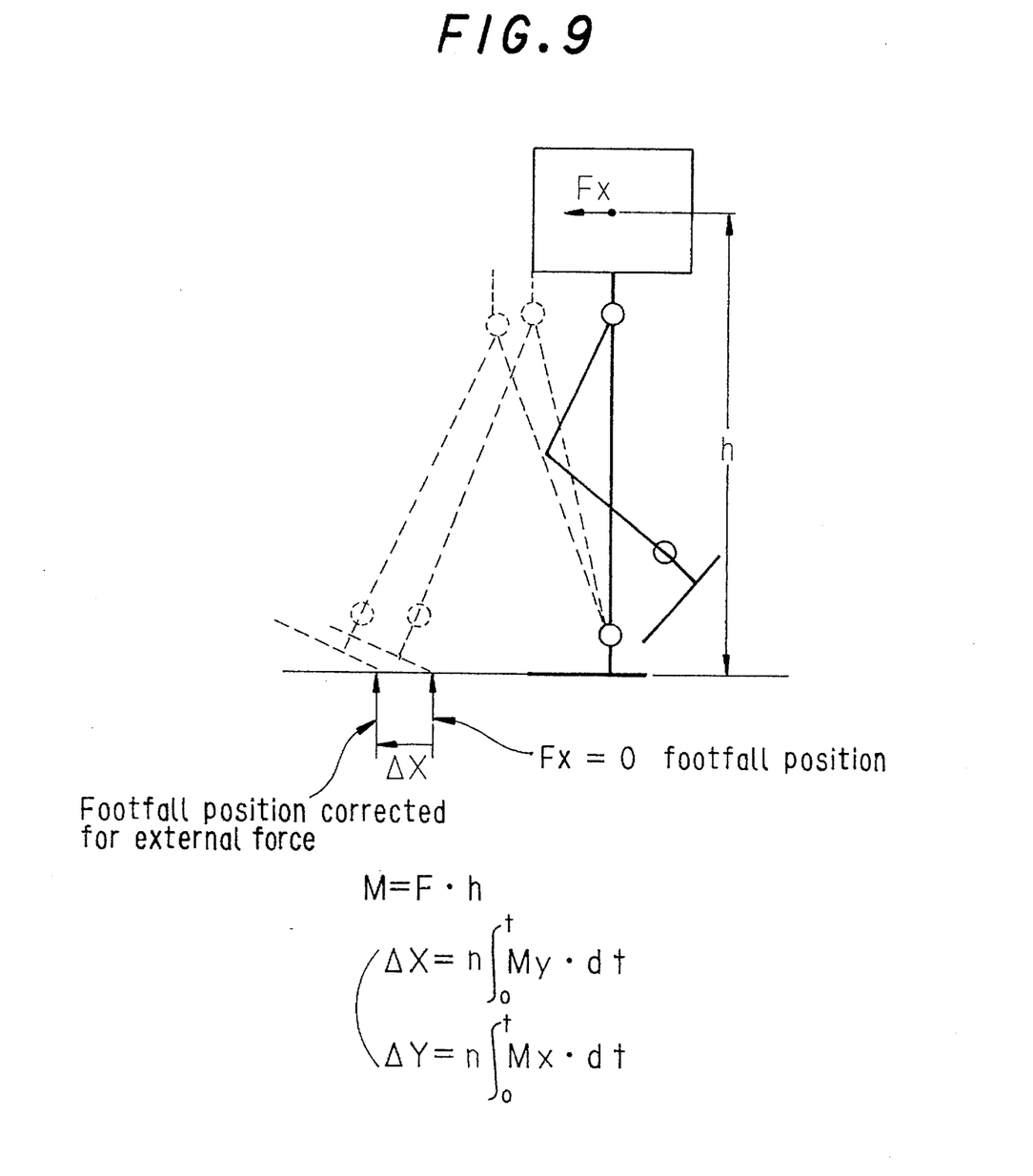
FIG. 9 is a diagram similar to that of FIG. 5 for explaining the corrective action taken when the legged robot of FIG. 1 receives an external force in its direction of locomotion.

Simply stated, what this control amounts to is stabilizing the robot's attitude by, in FIG. 5, responding to the external force by correcting the footfall position of the free leg diagonally to the rear. If, as shown in FIG. 9, the robot instead receives an external force Fx in the x direction, i.e. in or opposite to the direction of travel, the situation remains substantially the same, aside from the fact that nearly all of the moment is the moment My around the y axis. The amounts of correction are therefore calculated using the equations shown in the same figure and the footfall position of the free leg is corrected diagonally rearward (forward). For preventing the robot from spinning around the z axis upon receiving an external force in the x or y direction, the soles of the foot members 22 are coated with an elastic material such as rubber so as to increase the adhesive friction with the ground surface.

Based on the foregoing, the control operation will now be explained with reference to the flow chart of FIG. 4. After all parts of the system have been initialized in step S10, control passes to step S12 in which a check is made as to whether or not walking has been terminated. If it has not, control then passes to step S14 in which the data time t(n) is initialized, to step S16 in which a check is made as to whether or not the time t(n) is greater than one locomotion cycle (one locomotion cycle being defined as that starting from a two leg support period, passing through a one leg support period, and returning to a two leg support period; the equivalent of one human step), and if the time is within one locomotion cycle, to step S18 in which timer interruption is awaited, and to step S20 in which the locomotion data (the free leg footfall position etc.) at time t(n) is read. Control then passes to step S22 in which the moments Mx and My resulting from any external force received by the robot are found, to S24 in which the integration referred to earlier is conducted, to step S26 in which the amounts of free (lifted) leg footfall position correction delta X, delta Y are calculated, to step S28 in which the amounts of correction are added to the preset data X, Y, and to step S30 in which the angles of the 12 joints required to achieve the attitude corresponding to the corrected footfall position are calculated. Control then passes to step S32 in which the calculated values are output, to step S34 in which the time is incremented, and then back to step S16. If it is found in step S16 that the time t(n) exceeds one locomotion cycle, control returns to step S12, whereafter, up to the time that step S12 determines that the walking has been terminated, it repeatedly loops through the step S16, step S18 and the following steps while resetting the time in step S14 during each loop. When it is found in step S12 that the walking has been terminated, control passes to step S36 where required postprocessing is conducted and the program terminated.

As explained in the foregoing, this embodiment of the invention is constituted such that the moment acting on the body (main unit) is detected by the external force sensor (six-dimensional force and torque sensor), the footfall position of the free leg is corrected in the x direction (travel direction) and the y direction (direction perpendicular to the travel direction) in accordance with the detected moment and the joint drive values are controlled to enable footfall at the corrected position. The system is therefore able to restore the robot to a stable attitude immediately upon its being affected by an external force. Further, since the restoration of stability is achieved by correcting the footfall position of the free leg, the robot is stable even against large external forces. In addition, the amount of correction of the free leg footfall position is determined as the product of the integrated moment and a coefficient n which increases as the position of the free leg on its trajectory approaches the footfall position. During the period that the external force continues to act on the robot, therefore, the amount of correction is appropriately determined in light of the magnitude of the external force as required for restoring the robot to a stable attitude. Moreover, the rate of correction is made higher in the case where the external force is received in the vicinity of footfall than, for example, in the case where it is received in the vicinity of liftoff. As a result, the joints are driven more rapidly in the former case than in the latter. Because of this, the robot can always be restored to a stable attitude immediately upon being acted on by an external force, irrespective of the position at which the force arises in the course of the one leg support period.

Figure 10:
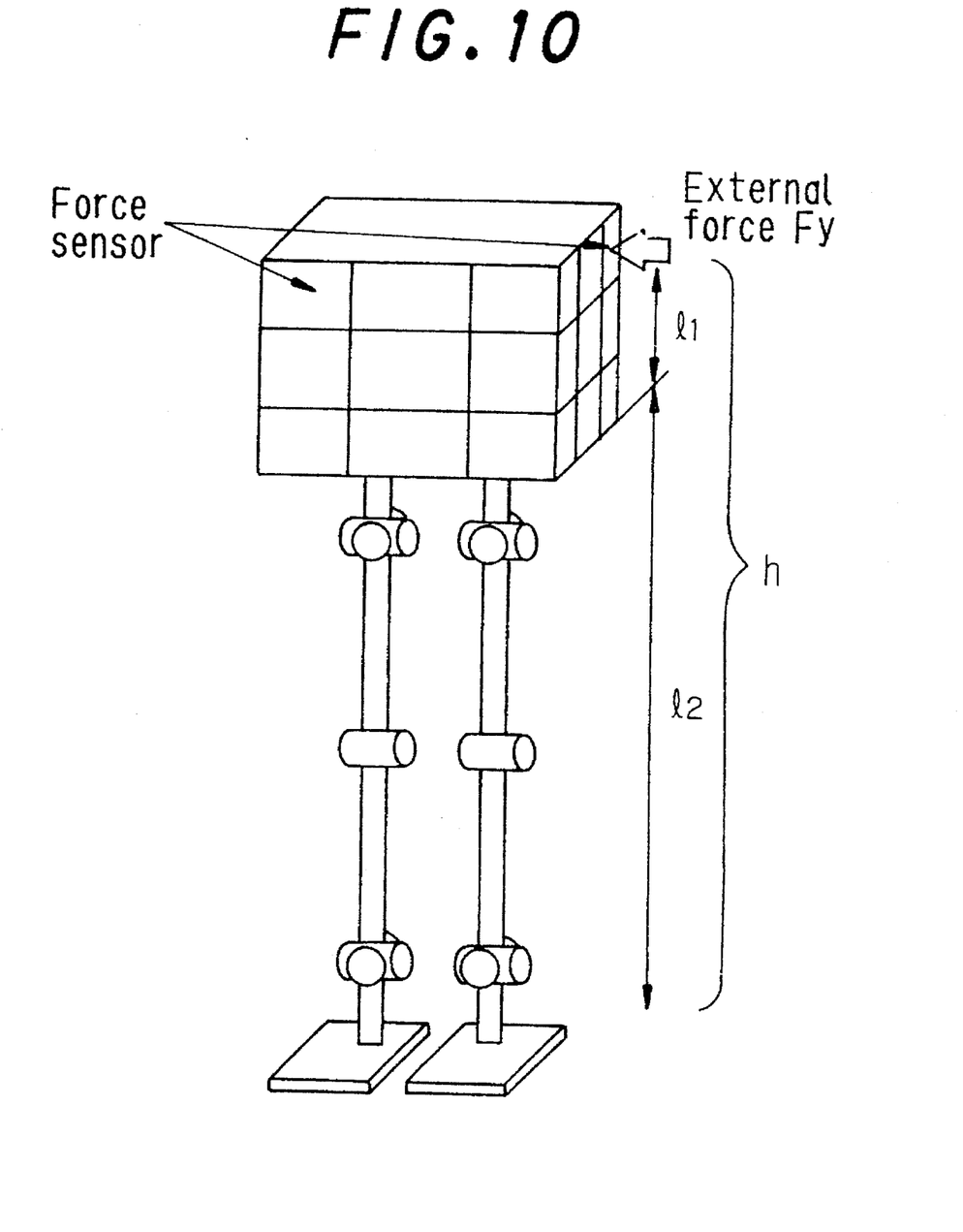
FIG. 10 is a perspective view similar to that of FIG. 2 for explaining a second embodiment of the system for controlling the locomotion of a legged robot according to the invention.
Figure 11:
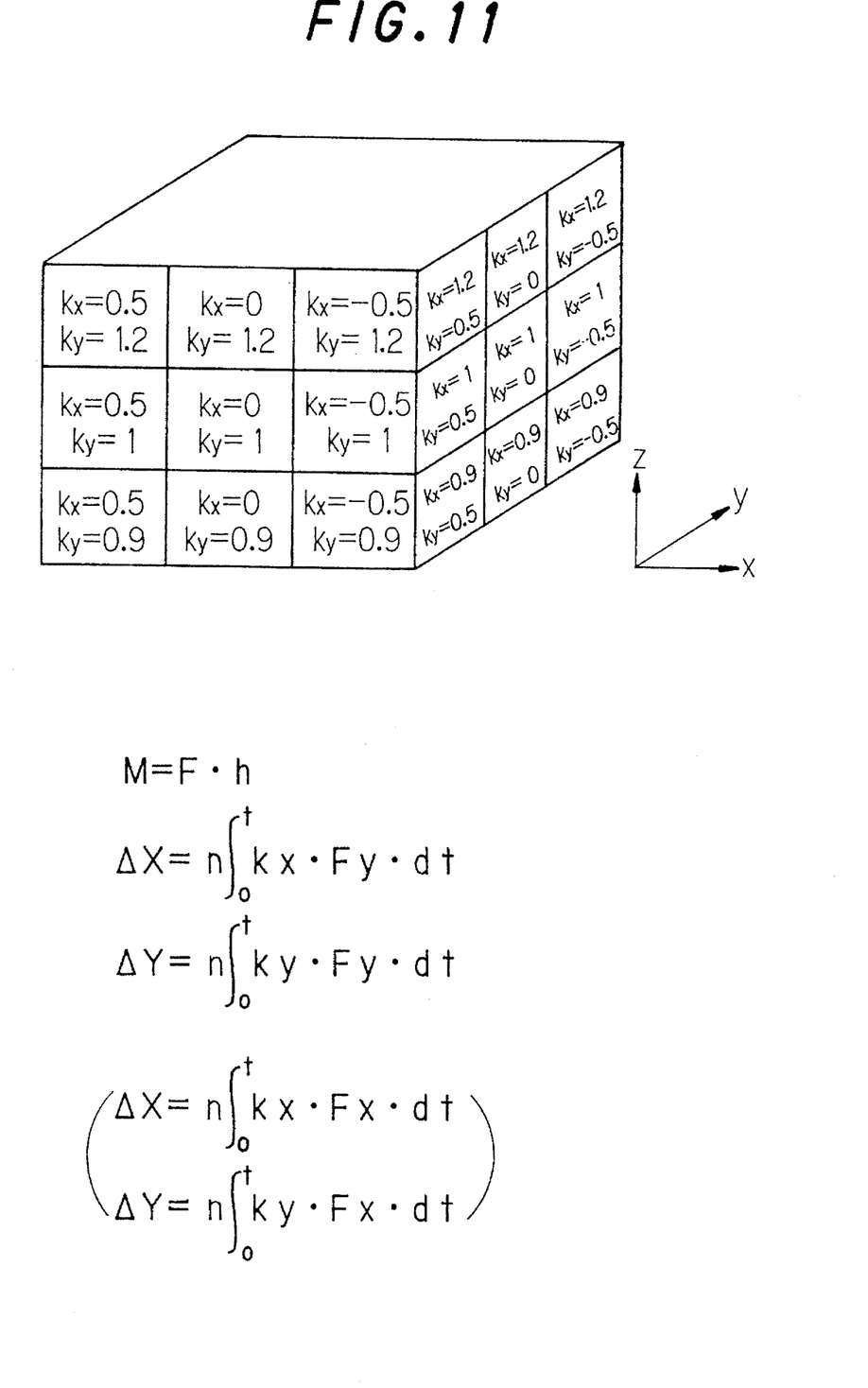
FIG. 11 is a perspective view for explaining the manner in which the external force sensor of the legged robot shown in FIG. 10 is mounted.

FIG. 10 shows a second embodiment of the invention in which the external sensor is constituted not by disposing a six-dimensional force and torque sensor on top of the body 24 but instead by disposing a plurality of relatively cheap piezoelectric element type sensors 44 around the body 24 (nine sensors per side in the illustrated embodiment). The coordinates at which the sensors are disposed are stored in the ROM 66 so as to enable detection of the positions at which external forces act on the body 24. The equations at the bottom of FIG. 11 are used to calculate the amount of correction of the free leg footfall position in approximately the same way as in the first embodiment, except for the following differences. The moment M is calculated as the product of the force F detected by the piezoelectric element concerned and the value h obtained by adding the distance 11 from the base of the body 24 to the piezoelectric element and the distance 12 corresponding to the length of the leg links. Since the actual length of the leg links varies with changing attitude of the robot during locomotion, the value h is an approximation. The moment M is therefore also an approximation. Since it is not possible in this case to detect the moment around the axis perpendicular to the direction in which the force F is acting, moment coefficients kx, ky are defined in advance for the individual piezoelectric elements as shown in FIG. 11 and the so-defined coefficients are stored in the ROM 66 for use in calculating the correction amounts delta X, delta Y using the equations at the bottom of FIG. 11. This embodiment also uses the integral value of the external force Fx (Fy). The second embodiment has the advantage of being simpler in structure than the first embodiment.

In the first and second embodiments, the amount of correction is varied with the position of the free leg on its trajectory by multiplying the integral value by the coefficient n. Instead, however, the correction amount can be determined on the basis of only the value obtained by integrating the external force. Also, while the integral value is multiplied by the coefficient n in the first and second embodiments, it is alternatively possible to use the sum of the integral value and the coefficient n.

In addition, instead of determining the amount of correction only from the moments Mx and My as in the first and second embodiments, its possible to determine it with further consideration to the moment Mz around the z axis. Further, instead of correcting the footfall position of the free leg, it is possible to correct the footfall position of either of the legs in response to an external force received during a two leg support period.

Moreover, the invention can be applied not only to a biped robot as explained in the foregoing, but can also be applied to a legged locomotion with three or more legs.

The present invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling the locomotion of a legged walking robot having a body link and articulated leg linkages each connected to the body link through a first joint and having at least a second joint of the type having:

actuator means for driving the joints; and control means for determining a control value of the actuator means for each of the joints based on locomotion data including a landing position of a lifted leg linkage;

wherein the improvement comprises:

a cover supported by an external force sensor on the body link, with the force sensor linked to the control means, for detecting an external force exerted on the body link; and said control means adjusts the control value for at least one of the joints of a lifted leg linkage in response to the detected external force to shift the landing position of the lifted leg linkage in a direction in which the external force acts.

2. A system according to clam 1, wherein said control means includes:

first means for determining a moment acting on the body link from the detected external force; and second means for correcting the landing position by an amount in response to the determined moment;

and said control means adjusts the control value such that the lifted leg linkage will land at the corrected position.

3. A system according to claim 2, wherein said second means increases the amount with increasing moment.

4. A system according to claim 2, wherein said control means includes:

third means for integrating the determined moment while the external force is exerted;

and said second means corrects the landing position by an amount in response to the integrated moment.

5. A system according to claim 4, wherein said second means increases the amount with increasing integrated moment.

6. A system according to claim 1, wherein said control means includes:

fourth means for determining a coefficient in accordance with the locomotion data; and fifth means for correcting the landing position by an amount determined form a value obtained by multiplying the detected external force by the coefficient;

and said control means adjusts the control value such that the lifted leg linkage will land at the corrected position.

7. A system according to claim 1, wherein said control means includes:

sixth means for determining a moment acting on the body link from the detected external force;

seventh means for determining a coefficient in accordance with the locomotion data; and eighth means for correcting the landing position by an amount determined form a value obtained by multiplying the determined moment by the coefficient;

and said control means adjusts the control value such that the lifted leg linkages will land at the corrected position.

8. A system according to claim 7, wherein said seventh means determines the coefficient in accordance with a trajectory of the lifted leg linkage.

9. A system according to claim 8, wherein said seventh means increases the coefficient with increasing proximity to the next landing.

10. A system according to claim 1, wherein said first means includes:

ninth means for detecting a position at which the external force is exerted;

tenth means for calculating a moment by multiplying the external force by a distance from a reference level to the position at which the external force is exerted; and eleventh means for correcting the landing position of a lifted leg linkage by an amount in response to the calculated moment;

and said control means adjusts the control value such that the lifted leg linkage will land at the corrected position.

11. A system for controlling the locomotion of a biped walking robot having a body link and a pair of articulated leg linkages each connected to the body link through a hip joint and having at least a second joint and a foot, including:

actuator means for driving the joints; and controls means for determining a control value of the actuator means for each joint based on predetermined locomotion data including a foot landing position of a lifted leg linkage;

wherein the improvement comprises:

a plurality of sensors positioned on the body link and linked to the control means for detecting an external force exerted on the body link;

first means for determining a moment acting on the robot from the detected external force; and second means for correcting the predetermined foot landing position from that in the locomotion data in a direction in which the external force acts by an amount in response to the determined moment;

and said control means adjusts the control value for at least one of the associated drive joints of the lifted leg linkage such that the lifted leg linkage's foot lands at the corrected position.

12. A system according to claim 11, wherein said second means includes:

means for determining a coefficient in accordance with the trajectory of the lifted leg linkage in the predetermined locomotion data;

and said second means corrects the predetermined foot landing position by an amount in response to a value by multiplying the determined moment by the coefficient.

13. A system according to claim 11, wherein said plurality of sensors comprises a six-dimensional force and torque sensor.

14. A system according to claim 11, wherein said first means comprises of a memory for storing a position at which a detected force acts.

15. A system according to claim 11, wherein said first means determines the moment about the axis in the robot's traveling direction or in the lateral direction thereto.

16. A system for controlling the walking movement of a robot having a body and a pair of legs connected to the body through hip joints, each leg having a knee joint and a foot, comprising:

motors for driving the hip joints and knee joints;

a controller for controlling the motors, based on walking data in a memory including a foot landing position of a lifted leg;

a detector linked to the controller for detecting an external force acting on the robot body; and a foot landing position compensator, associated with the controller for determining a moment acting on the robot body resulting from the external force and for controlling the motors to shift the foot landing position of the foot of the lifted leg, in the direction in which the external force acts on the robot body, by an amount proportional to the product of an integrated value of the moment and a coefficient which increases as the leg approaches footfall.

\* \* \* \* \*

UNITED STATES PATENT AND TRADEMARK OFFICE
CERTIFICATE OF CORRECTION

PATENT NO. : 5,513,106

DATED : April 30, 1996

INVENTOR(S) : Yoshino et al.

It is certified that error appears in the above-indentified patent and that said Letters Patent is hereby corrected as shown below:

Column 7, claim 2, line 15, delete "clam" and insert -- claim --.

Column 8, claim 11, line 11, before "means" delete "controls" and substitute -- control --.

Column 8, claim 14, line 42, delete "of".

Signed and Sealed this

First Day of October, 1996

Attest:

BRUCE LEHMAN

Attesting Officer

Commissioner of Patents and Trademarks